March 3, 1931. W. C. GRAHAM ET AL 1,794,374
PROCESS AND APPARATUS FOR SEPARATING SUBSTANCES FROM LIQUIDS
Original Filed Jan. 5, 1925
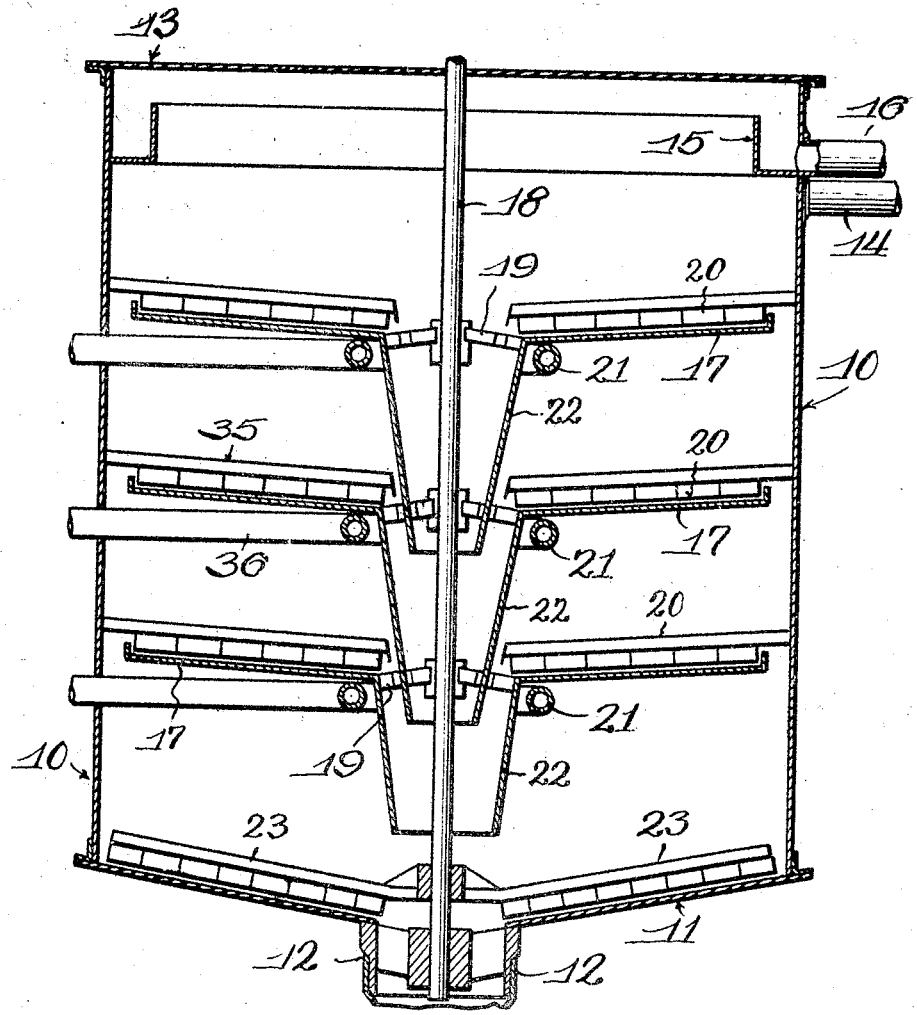
Inventors,
Walton C. Graham,
Horace S. Rumsey
and Ashur W. Wetherbee,
By: George Bayard Jones, Atty.
Witness:
Chas. L. Loursh.

Patented Mar. 3, 1931

1,794,374

UNITED STATES PATENT OFFICE

WALTON C. GRAHAM, OF DENVER, COLORADO, HORACE S. RUMSEY, OF ST. LOUIS, MISSOURI, AND ASHUR U. WETHERBEE, OF EVANSTON, ILLINOIS, ASSIGNORS TO GILCHRIST & COMPANY, A CORPORATION OF DELAWARE

PROCESS AND APPARATUS FOR SEPARATING SUBSTANCES FROM LIQUIDS

Original application filed January 5, 1925, Serial No. 496. Divided and this application filed August 3, 1926. Serial No. 126,910.

This invention relates to an improved process and apparatus for separating substances, such as solids and gases, from liquids, and the present application is a division of our co-pending application, Serial Number 496, filed January 5, 1925.

The object of the invention is to provide for a more complete separation of finely divided substances from the liquid, than has been possible heretofore, in apparatus of this general character.

In typical prior apparatus, the material to be separated enters the settling chamber through an upper central opening, the suspended particles settling to the bottom and the clearer liquid moving slowly outwardly, more or less radially, to suitable outlets. Mechanical sweeps or scrapers are arranged to push the deposited matter in toward a lower central opening. The movement of the deposited material and of the clear liquid is therefore in opposite directions, resulting in stirring up the liquid to some extent and causing some of the finer particles, at least, to be restored into suspension.

An object of the present invention is to overcome these difficulties by means of an improved process and apparatus providing a parallel flow of deposited matter and of the clear liquid radially inward toward the center, whereby remixing of said solids and liquid is reduced to a minimum.

Another object is to provide apparatus in which the bottoms of the compartments on which the sediment settles rotate, there being fixed mechanical sweeps in the sediment, whereby the relative rotation of these adjacent members causes the sweeps to move the sediment toward the outlets.

An additional object is to provide an improved process and apparatus of the character described, whereby operation through multiple stages of settling and drawing off the clear liquid will increase the clarity of the final liquid, each stage maintaining equal efficacy, whereas with prior apparatus such successive operations decreased the effectiveness of the separation.

A further object is to provide equipment of this character having increased efficiency and capacity.

In the accompanying drawing we have illustrated, in sectional elevation, one embodiment of the invention.

The equipment comprises a suitable tank having an outer wall 10 which is preferably of cylindrical form, with a bottom 11 which may be inclined to form a conical discharge with an outlet 12, the tank having a closed top 13. A suitable liquor head is maintained in this tank by means of a supply pipe 14 communicating with a reservoir (not shown) for the fluid containing gas, air, or other substances, such as solid particles in finely divided state, which are to be separated. An overflow member 15 is provided, whereby the scum may overflow the top thereof and be drawn off through the discharge pipe 16.

The tank is divided preferably into a plurality of vertically superimposed chambers by one or more transverse partitions 17 which are preferably in the form of substantially horizontal disks which terminate short of the outer wall 10, so as to leave a clearance space down through which the liquid flows. Although the drawing shows equipment having a plurality of settling chambers and a common lower chamber for the accumulated sediment, a single settling chamber, together with a lower sediment chamber is contemplated.

A rotatable shaft 18 carries a plurality of brackets or spiders 19 on which are mounted the partitions or shelves 17. Said shelves are preferably inclined toward the discharge outlet, and for this purpose are slightly dished. In other words, each slopes inwardly toward a central discharge opening. By virtue of this mounting, the shelves rotate instead of being stationary, as in the prior practice, and the sweeps 20 instead of being mounted on the shaft are stationary, being mounted in any suitable manner, as, for example, by securing them to the side wall 10 of the tank by means of the member 35.

A suitable outlet is provided near the inner and upper part of each chamber. The pipe 21 may be used as such outlet, providing a plurality of circumferential openings for drawing off the clear liquid, which is conducted to the outside of the tank through the pipe 36. A wall 22, which may have the form of a conical discharge outlet is also secured to the spiders 19, thereby providing a separate passageway for the sediment, completely shutting it off from the clear liquid in the adjacent chamber.

The fluid enters through the inlet 14, the scums rising and flowing over the top of the wall 15, said wall forming a ring of large diameter. The scums are drawn off through the outlet 16. The liquid flows slows downwardly through the outer circumferential clearance spaces between the periphery of the trays and the outer wall of the tank, and the sediment is slowly pushed inwardly as the trays rotate, said sediment passing downwardly through the central discharge funnels and accumulating in the lowermost compartment near the center thereof. Additional sweeps 23 may be provided for this compartment, if desired, the same being mounted on the shaft 18 and rotating therewith. In this apparatus, it will be noted that the flow of liquid in the several chambers is more or less radially inward, the clear liquid being drawn off through outlets located near the center of each chamber, and the sediment being discharged also near the center of each chamber, but at the bottom thereof. Furthermore, the particles which settle last are moved the shortest distance. As the solids are deposited they are continually being removed mechanically in the same direction as the liquid is flowing;—that is, inwardly, and the gases and floating material are continuously passing out at the top. For this reason, there is less tendency to agitate the deposited material and cloud the liquid than in the prior practice in which there is a counter-flow of deposited material with reference to the clear liquid.

In prior systems, the sediment falls in the form of what may be called a "screen" into the lower compartment and the fluid entering the lower compartment centrally thereof is compelled to pass out through this falling screen, thereby picking up much of the sediment, necessitating that it be re-deposited. This operation is repeated as often as there are compartments. In view of this action, the number of compartments which may be used is quite limited, whereas in the present apparatus a large number of compartments may be used as there is no diminution of capacity in the lower compartments, each compartment operating with equal efficiency.

The means for regulating the flow of the fluid through the tank is not shown, but may be any suitable means therefor, such as valves controlling the inlet 14 and the outlet pipes 36. Any suitable method of control may be used, the aim being to keep all of the compartments full and the tank itself filled up high enough so that the scum may overflow over the rim 15.

Thus, the invention may be embodied in various other forms, the apparatus shown herein being selected primarily for purposes of illustration.

What we claim is:

1. The process of separating liquid and other substances which consists in introducing the fluid into a plurality of adjacent chambers, simultaneously removing the substances from the liquid by permitting separation of said substances by gravity, discharging the accumulated heavier substances centrally into a common discharge chamber without contaminating the liquid in the adjacent settling chambers and the lighter substances outwardly and upwardly, and removing the clear liquid from near the center of said settling chambers.

2. Apparatus for separating substances in suspension from fluids, comprising an outer wall providing a chamber, a transverse wall in said chamber dividing the same into a plurality of superimposed compartments, a peripheral inlet for said fluid, a central outlet for the clear liquid, a separate central outlet for the sediment, and sweeps for moving said sediment towards its outlet, the movement of said liquid and said sediment being substantially radially inward to avoid re-suspension.

3. Apparatus for separating substances in suspension from fluids, comprising a cylindrical outer wall, substantially horizontal transverse partitions therein having central openings for the withdrawal of settled substances and terminating short of said outer wall to provide annular openings for the introduction of the fluid, separate centrally located outlets for clarified fluid above each partition, said fluid flowing from said annular openings toward the central fluid outlets and sweeps for moving the sediment which accumulates on each of said horizontal partitions generally in the same direction as the flow of said fluid above said partition.

4. Apparatus for separating substances in suspension from fluids, comprising a cylindrical outer wall, a vertical rotatable shaft centrally arranged therein, a series of supporting members secured to said shaft, one over the other, conical discharge outlets supported by said members, a dished tray secured to the upper end of each of said conical outlets and rotatable therewith, and stationary sweeps mounted on said cylindrical wall and arranged above each tray in close proximity therewith.

5. Apparatus for separating substances in suspension from fluids, comprising a cylindrical outer wall, a vertical rotatable shaft centrally arranged therein, a series of supporting members secured to said shaft, one over the other, conical discharge outlets supported by said members, a dished tray secured to the upper end of each of said conical outlets and rotatable therewith, stationary sweeps mounted on said cylindrical wall and arranged above each tray in close proximity therewith, and an outlet pipe arranged near the juncture of each of said conical members and said dished trays for drawing off clear liquid.

6. Apparatus for separating substances in suspension from fluid comprising a cylindrical outer wall, a series of dished trays therein arranged one over the other, and each having a central opening therein, forming a plurality of settling chambers, a conical member depending from each of said openings and extending through the chamber beneath said tray to a point below the next lower tray, a rotatable shaft on which said conical members and trays are supported, and a series of sweeps supported by said cylindrical wall and arranged to move the sediment inwardly toward said conical members whereby said sediment is discharged through the lowest compartment.

7. The process of separating a liquid from substances suspended therein comprising introducing the liquid into the peripheries of a plurality of superposed chambers at a plurality of points in each chamber, causing the liquid to flow only in radial directions toward the center of each respective chamber from its periphery while said substances are settling toward the bottom of each respective chamber, moving the settling substances radially toward the lower central portion of each chamber, removing the clarified liquid from the upper central portion of each chamber, and preventing any of the substances while being removed from becoming resuspended in the liquid.

8. An apparatus for separating fluids from substances suspended therein comprising, a tank having a plurality of upwardly facing partitions therein forming the bottoms of superposed chambers, inlet means for introducing the fluid into several of the chambers at a plurality of points near the peripheries thereof, means for moving the settled substances in radial directions toward the centers of the same said several chambers, means for withdrawing the settled substances from the lower central portions of the same said chambers, outlet means for withdrawing the clarified fluid from the upper central portions of the respective same said chambers and for causing the fluid to flow only radially inwardly from said inlet means to said outlet means, the fluid outlet in each same said chamber being adjacent the sediment outlet in the respectively above lying chamber, and means for separating the fluid outlets from the sediment being discharged from the superposed chambers to prevent resuspension of the sediment in the fluid.

9. An apparatus for separating a fluid from substances suspended therein comprising, a chamber having a transverse upwardly facing inner surface for receiving substances settling thereon, inlet means for introducing the fluid at a plurality of points to the space above said surface near the periphery of the chamber, means for moving the settled substances in radial directions toward the center of the chamber, means for withdrawing said substances from said surface at the central portion of the chamber, and outlet means for withdrawing the clarified fluid from the upper central portion of the space above said surface and for causing it to flow only radially inwardly from said inlet means to said outlet means.

10. An apparatus for separating a fluid from substances suspended therein comprising, a tank having a plurality of upwardly facing partitions therein forming the bottoms of superposed chambers, inlet means for introducing the fluid into several of the chambers at a plurality of points near the peripheries thereof, means for moving the settled substances to the centers of the chambers in radial directions, means for withdrawing the settled substances from the central portions of the chamber, and outlet means for withdrawing the clarified fluid from the upper central portions of the same several chambers respectively and for causing it to flow only radially inwardly from said inlet means to said outlet means.

11. The process of separating a fluid from substances suspended therein comprising, introducing the fluid into the periphery of a chamber at a plurality of points, causing the fluid to flow in radial directions only toward the center of the chamber from the periphery thereof while said substances are settling, moving the settled substances radially toward the center of the chamber, and removing the clarified fluid and the settled substances separately from the central portion of the chamber.

12. An apparatus for separating a fluid from substances suspended therein comprising, a tank, a transverse partition in said tank dividing the tank into a plurality of superposed compartments, a plurality of fluid inlets near the periphery of one of the compartments, centrally located separate outlets for the said one compartment for the settled substances and the clarified fluid, the apparatus being adapted to cause the fluid to flow from said inlets only radially inwardly in said one compartment toward its central fluid outlets while the substances are settling therefrom, and means for moving the settled substances in said one compartment toward the sediment outlet therefor in radial directions generally parallel to the flow of the fluid while the latter is moving toward its outlets.

In testimony whereof, we have subscribed our names.

WALTON C. GRAHAM.
HORACE S. RUMSEY.
ASHUR U. WETHERBEE.